United States Patent [19]

Hardy

[11] 3,923,400
[45] Dec. 2, 1975

[54] REAL-TIME WAVEFRONT CORRECTION SYSTEM

[75] Inventor: John W. Hardy, Lexington, Mass.
[73] Assignee: Itek Corporation, Lexington, Mass.
[22] Filed: Jan. 3, 1974
[21] Appl. No.: 430,456

[52] U.S. Cl.............. 356/107; 356/111; 350/160 R
[51] Int. Cl.²...................... G01B 9/02; G02B 5/23
[58] Field of Search ........... 356/106, 107, 109, 110, 356/111; 350/160 R, 161, 299

[56] References Cited
UNITED STATES PATENTS

| | | | |
|---|---|---|---|
| 3,463,572 | 8/1969 | Preston, Jr. | 350/161 |
| 3,527,537 | 9/1970 | Hobrough | 356/106 R |
| 3,632,214 | 1/1972 | Chang et al. | 356/106 R |
| 3,836,256 | 9/1974 | Peters | 356/109 |

OTHER PUBLICATIONS

"Deformable Optical Elements With Feedback;" Horace Babcock, JOSA Vol. 48, No. 7, July 1958.
Wyant; "Double Frequency Lateral Shear Interferometer;" 12 Applied Optics, 2057; 9/73.

Primary Examiner—Alfred E. Smith
Assistant Examiner—Conrad J. Clark
Attorney, Agent, or Firm—Homer O. Blair; Robert L. Nathans; Gerald H. Glanzman

[57] ABSTRACT

An optical imaging system having the capability of detecting and eliminating in real-time phase distortions in a wavefront being imaged by the optical system. The resolution of ground based telescopes is severely limited by random wavefront phase changes and tilts produced by atmospheric turbulence. The disclosed invention was designed to overcome this problem. In the disclosed invention, an AC, lateral shearing interferometer measures in real-time the relative phase differences of the wavefront being imaged by the optical system. Phase differences measured by the shearing interferometer are directed to an analog data processor which, in combination with other circuitry, generates a plurality of electrical signals proportional to the required phase corrections at different areas of the wavefront. The electrical signals are applied to a phase corrector upon which the wavefront is incident to change the relative phase at various locations of the wavefront to achieve a wavefront in which the phase distortion is removed. In one embodiment the phase correction device consists of a mirror having an array of piezoelectric elements which function to selectively deform the mirror to correct phase distortions in the wavefront. In a second embodiment the phase correction device consists of a refractive device which has the capability of having its index of refraction selectively changed in different areas to correct phase distortions in the wavefront.

12 Claims, 10 Drawing Figures

PRINCIPLE OF WHITE LIGHT GRATING SHEARING INTERFEROMETER IN ONE (X) DIRECTION

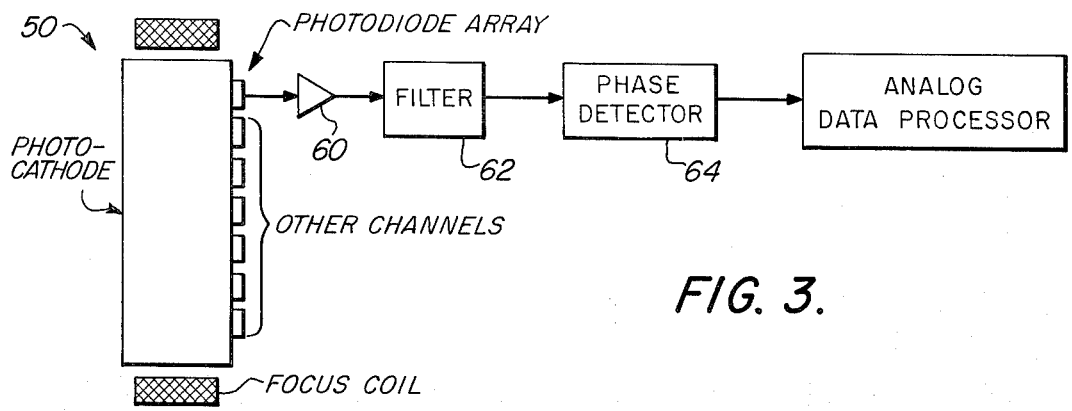
FIG. 3.
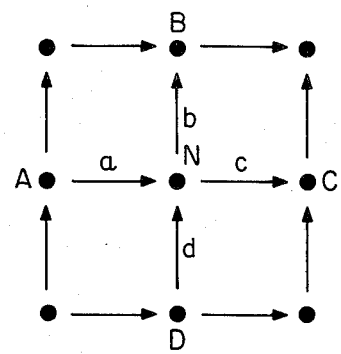
$$N = 1/4 \left[ A + B + C + D + a - b - c + d \right]$$
PHASE DETERMINATION AT ONE POINT
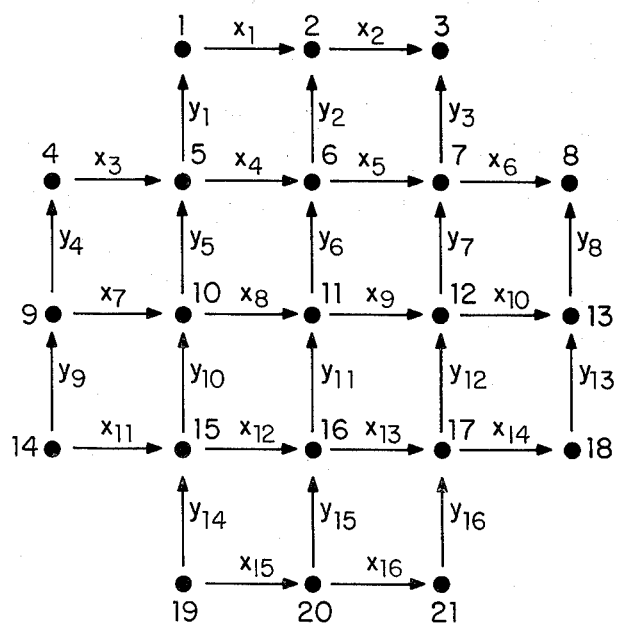
FIG. 5.
COMPLETE MATRIX $$N = 1/4 [A + B + C + D + a - b - c + d]$$

COMPUTING ELEMENT

SHEARED WAVEFRONT MODEL

OPTIMUM LOCATION OF PHASE SENSORS

REAL-TIME WAVEFRONT CORRECTION SYSTEM

BACKGROUND OF THE INVENTION

The resolution of ground based optical imaging systems is severely limited by random wavefront tilts and phase changes produced by atmospheric turbulence. The resolution of such optical systems is usually limited to one or two arc seconds by the atmosphere and may be considerably improved if the atmospheric distortion is measured and then corrected. It is possible to perform these operations either prior to detection (predetection) by correcting the wavefront in real-time before recording the image on tape or film, or alternatively to record the distorted data first and perform the processing in a subsequent operation (postdetection). A comparison of the performance capabilities of predetection and postdetection processing systems indicates that in practice predetection processing offers superior performance.

The present invention relates generally to ground based telescopic systems which view objects of interest through the atmosphere. More particularly, the present invention relates to a new and improved telescopic optical system which has the capability of detecting and correcting in real-time phase distortions in the wavefront being imaged by the optical system. More particularly, the present invention relates to a system which senses the wavefront distortion produced by the atmosphere on a wavefront incident on the entrance pupil of the telescope, and reimages the incident wavefront onto a phase correction device which removes the distortion to produce a corrected image of the object being observed. Because of the rapidly changing nature of the atmosphere, the system must provide a real-time response having a response time to changing conditions of no longer than a few milliseconds.

An AC shearing interferometer measures the relative phase shifts at points in the wavefront separated by the shear distances in the $x$ and $y$ directions at an array of locations in the sheared image plane. The computation required to convert the $x$ and $y$ phase values measured by the shearing interferometer into the phase correction values required by the present invention is mathematically a matrix inversion followed by a least squares smoothing operation. According to prior art data processing techniques, a relatively large digital computer would be required to carry out this operation serially for a large number of channels at the required speed. Also, input and output multiplexers and A/D and D/A hardware would be required. When real-time operation is required, as in the present invention, serial operation is too slow, unless an extremely fast computer is utilized. The cost of such a prior art data processor system would be very high.

SUMMARY OF THE INVENTION

In accordance with a preferred embodiment, a system is disclosed for changing in real-time the phase relationship of different areas of a wavefront. The phase relationship of different areas of the incident wavefront are detected, and the detected phase relationships are utilized to apply signals to a phase corrector, which has the wavefront incident thereon, to change the phase relationships of the different areas to reshape the wavefront.

The use of real-time predetection processing allows random variations produced by the atmosphere to be largely removed, thus allowing the inherent resolution of the telescopic optical system to be utilized. In principle, the wavefront correction device will also compensate for distortion in the optical system itself so that near diffraction limited performance may be obtained from imperfect optical systems. The preferred embodiment makes use of an AC white light shearing interferometer to measure the wavefront distortion. In the preferred embodiment, the output of the shearing interferometer is processed by a high speed parallel data processor to obtain the required phase corrections.

BRIEF DESCRIPTION OF THE DRAWINGS

FIG. 3 illustrates one phase detection channel at the output of the shearing interferometer.

FIG. 4 illustrates the manner in which phase shift vectors are selectively combined to determine the required phase shift for one area of a wavefront.

FIG. 5 illustrates a complete matrix wherein phase shift values are derived for 21 separate areas of a wavefront.

DESCRIPTION OF PREFERRED EMBODIMENTS

Figure 1:
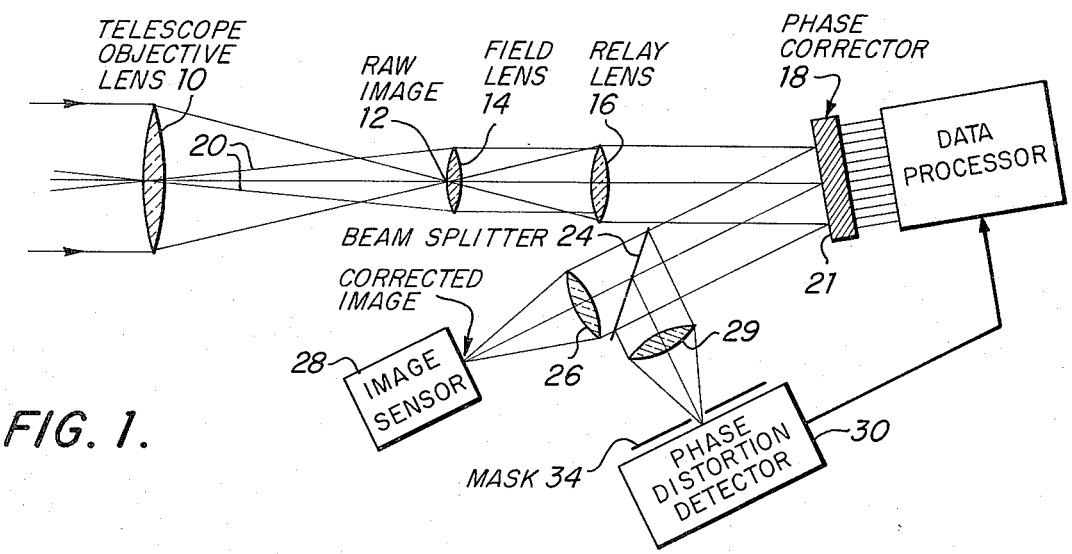
FIG. 1 illustrates a preferred embodiment of applicant's invention in which the phase corrector is a mirror which is selectively deformed by a plurality of piezoelectric elements.

Referring to FIG. 1 there is illustrated a preferred embodiment of applicant's invention. In FIG. 1 an objective lens 10 at the entrance pupil to the telescopic optical system produces a raw image 12 of a distant object at the prime focal plane of the optical system. This image may be severely distorted because of random wavefront tilts and phase shifts produced by atmospheric turbulence. In FIG. 1 the telescope is illustrated as a refractive instrument. However, the principle of operation of applicant's invention works equally well with reflective telescopic optical systems. A field lens 14 and a relay lens 16 function in combination to produce an image of the wavefront received at the entrance aperture (at objective lens 10) on a phase corrector 18. Also, the field lens 14 functions to prevent off axis radiation, illustrated at 20, from missing the relay lens 16. The image of the incoming wavefront produced on phase corrector 18 allows it to selectively change the phase of different areas of the wavefront image.

In the embodiment of FIG. 1, the phase corrector 18 includes an array of piezoelectric elements having a mirrored surface 21. The mirrored surface is selectively deformed in accordance with electrical signals applied to the array. A suitable phase corrector having this design is described in detail in U.S. patent application Ser. No. 392,163 for MONOLITHIC PEIZOELECTRIC WAVEFRONT PHASE MODULATOR, filed Aug. 27, 1963. The wavefront is reflected off the mirrored surface 21 to a beam splitter 24. Beam splitter 24 allows a first portion of the beam to pass to a lens 26 which forms a corrected image of the object being viewed on the surface of an image sensor 28. Image sensor 28 may be photographic film, or may be an electro-optical device such as an image tube. Beam splitter 24 deflects a second portion of the beam to a lens system 29 which forms an image of the reference object on a phase distortion detector system 30. In the preferred embodiment the phase distortion detector system 30 consists of an AC lateral shearing interferometer as described in detail in U.S. patent application Ser. No. 346,365, for SHEARING INTERFEROMETER, filed Mar. 30, 1973, by James C. Wyant, and now U.S. Pat. No. 3,829,219.

Figure 2:
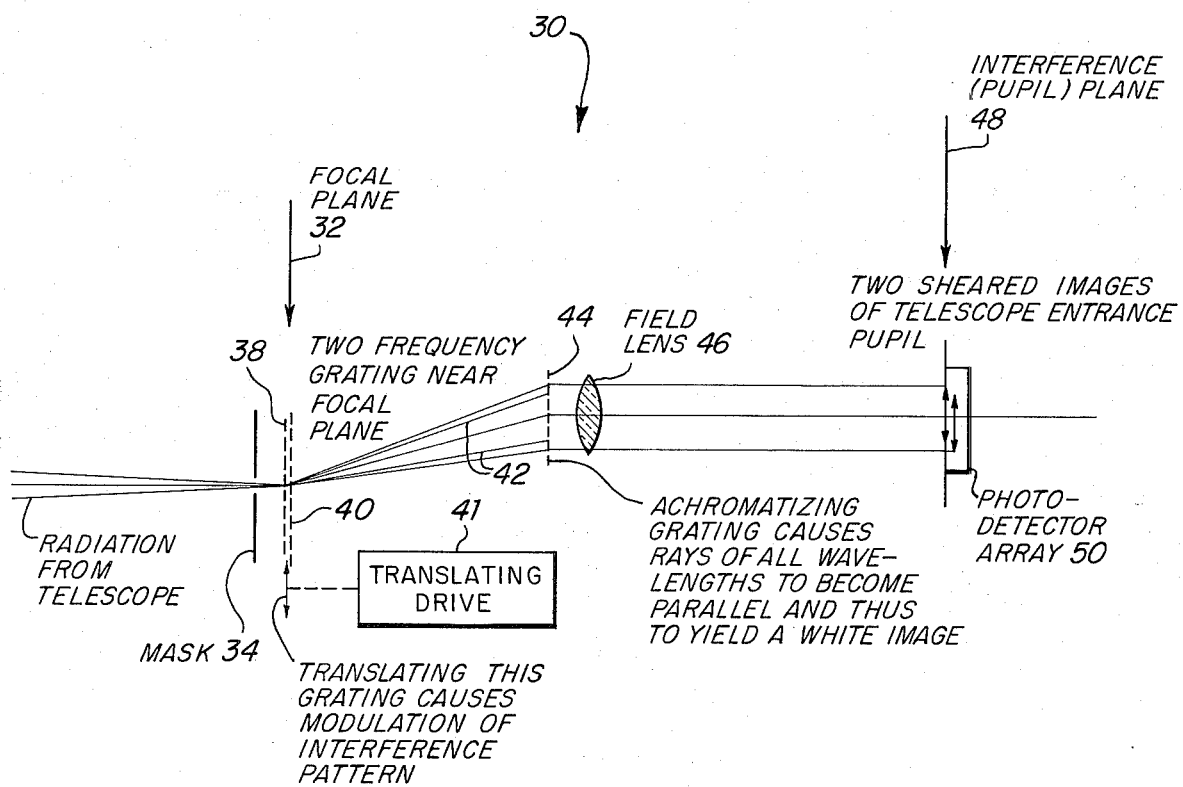
FIG. 2 depicts the lateral shearing interferometer which is utilized in the generation of required phase corrections for different areas of the wavefront.

Reference should be made to that patent application for a more complete understanding of the operation of the shearing interferometer. However, an abbreviated explanation of the interferometer will be given below. The net result of the optical arrangement of FIG. 1 is that an image of the reference object is formed at a focal plane 32 (see FIG. 2) in the phase distortion detector 30. This reference object may be a reference star which is different from, but angularly close to, the object of interest, or it may be the object of interest itself. Alternatively, it may be a laser beam angularly close to the object of interest directed from a vehicle through the atmosphere to the telescope. As shown in FIGS. 1 and 2, a mask 34 may be provided to allow only the image of that one object to pass to the focal plane 32.

FIG. 2 illustrates the principle of operation of the interferometer. Two slightly different diffraction gratings 38 and 40 are placed near the focal plane 32. These diffraction gratings are slightly different to produce two diffracted cones of light at two slightly different angles and having a common region of overlap. In the illustrated embodiment the diffraction gratings have line spacings at slightly different frequencies. The two diffraction gratings 38 and 40 may be produced holographically on a single photographic plate. For any given wavelength of light, the two gratings produce two diffracted cones of rays at two slightly different angles. This results in the formation of a shearing interferogram in the region of overlap 42 between the two cones of light. The two diffracted beams are incident upon a third achromatizing diffraction grating 44 having a diffraction frequency halfway between the diffraction frequencies of the gratings 38 and 40. As explained in the patent application referenced above, the achromatizing diffraction grating 44 allows the interferometer to operate with white light. The rays are diffracted again by grating 44 such that they are parallel to the optical axis. This is true regardless of the wavelength of the light because of the achromatizing grating 44. A field lens 46 produces an image at a further image plane 48 of the wavefront at the telescope entrance pupil. Because of the two diffracted cones of light, the field lens 46 actually produces two images of the wavefront at the entrance pupil slightly displaced from each other, and a shearing interferogram is produced in the region of overlap between the two images. In the interferogram the shear distance $L = \lambda a(f_1 - f_2)$ where $\lambda$ is the wavelength of the light, $a$ is the distance between the image plane diffraction grating and the pupil image plane and $f_1$ and $f_2$ are the diffraction grating frequencies. Also, the fringe spacing $S = R\lambda/L$ where $R$ is the wavefront radius. Substituting for $L$ in the two equations, it is determined that the fringe spacing $S$ is independent of $\lambda$ and is directly proportional to the wavefront radius $R$. Measurement of the fringe spacing $S$ will therefore reveal $R$ or the departure of the wavefront from its ideal shape which would be plane if the reference source were at infinity.

In the preferred embodiment, a higher sensitivity is obtained by modulating the interference pattern and sensing the phase at various points in the pattern with an array 50 of photodetectors. As taught in the above-referenced patent application, the interference pattern may be modulated by moving the gratings 38 and 40 with a velocity V in a direction normal to the line diffraction patterns on the gratings. Each point in the interference pattern is modulated at a modulation frequency $f_m = V(f_1 - f_2)$. In one embodiment the diffraction gratings 38 and 40 are moved linearly by an electromagnetic translating drive 41 similar to a moving coil loudspeaker movement. In this embodiment, grating frequencies $f_1$ and $f_2$ of 400 and 440 cycles per mm are utilized, giving a difference frequency $(f_1 - f_2)$ of 40 cycles per mm. If the time allowed for phase measurement is one millisecond and if it is desired to integrate this measurement over 10 cycles of modulating frequency to provide a better accuracy, then the required modulating frequency $f_m$ is 10 kHz, and the resultant grating velocity V is 250 mm/sec, which is easily achieved by the moving coil loudspeaker movement 41.

As explained in the above-referenced patent application, the system as shown in FIG. 2 yields wavefront information in only one direction (X). Since the wavefront is two dimensional (X and Y), a two dimensional system is required. This is achieved by utilizing two more diffraction gratings of the same type and in the same location as gratings 38 and 40 but with the direction of the diffraction patterns running at 90° relative to the patterns of 38 and 40. In the preferred embodiment all four diffraction gratings are produced holographically on one photographic medium. A second achromatizing grating, similar to grating 44 and having the same orientation as the third and fourth diffraction gratings will also be required along with a second array of photodetectors to measure phase differences and derive wavefront information in the Y direction. The $x$ and $y$ measuring systems may be combined into one system by producing all four diffraction gratings on one photographic medium and moving the photographic medium in a direction 45° relative to both directions of the four diffraction patterns. The 45° movement will then cause the gratings to have a component of movement in each of the X and Y directions. Referring to the calculation above, if the required grating velocity of one set of gratings is 250 mm/sec, then displacement at 45° relative to both grating directions would require a drive velocity of $\sqrt{2} \times 250 = 355$ mm per second. Using a drive system with an excursion of ±2 mm, the required drive frequency is 28 Hz, which is easily achievable with the moving coil loudspeaker movement 41.

Because of the rapidly changing nature of the wavefront distortion, parallel output sensor arrays are preferred over sequential scanning systems. A suitable array for this application would be an image intensifier-silicon diode array having a separate electrical output for each diode. This arrangement is feasible because of the moderate number of diodes in each array. In the disclosed embodiment an array of 32 photodiodes is required. The device is illustrated schematically in FIG. 3, and is constructed in a manner similar to an image intensifier tube, except that the silicon diode array is mounted in place of the phosphor output screen. In operation photoelectrons released by the photocathode are accelerated by the cathode potential and focused on the silicon diode array. A gain of up to 6,000 can be achieved with this arrangement, and photon noise is then predominant over other noise so that photon noise — limited detection is achieved.

FIG. 3 illustrates a suitable signal detection system for the shearing interferometer. Each photodiode has its own channel, and each channel consists of a preamplifier 60, a bandpass filter 62 tuned to the modulation frequency (10 kHz in the disclosed embodiment), and a phase detector 64. The outputs of the phase detectors are then combined in the analog data processor as will be explained later. In the disclosed embodiment the bandpass filter has a bandwidth of about 1 kHz which will accommodate the expected rate of change of wavefront phase, which may be several hundred Hz. The filter functions as an integrating network with its bandwidth of 1 kHz effectively averaging the phase of the 10 kHz modulating frequency over a period of one millisecond. The phase detector compares the phase of the 10 kHz signal with the phase of a reference signal and produces an analog output signal proportional to the difference in phase.

Because of the cyclic nature of the modulation the phase values are obtained modulo 1 wavelength. This means that unambiguous phase measurements may be made only over a range of ± ½ cycle relative to the phase of the reference signal. This is one reason for using a closed loop system, as will be further explained later, because in such a system the phase error is nulled, and the phase sensor need not operate over an unlimited range.

It is evident that all phase values produced by the interferometer are relative. Thus, one of the phase values (most conveniently the center one) must arbitrarily be designated as the reference and all other phase values are computed relative to the reference. In an optical imaging system the absolute phase of the lightwaves is irrelevant.

The computation required to convert the $x$ and $y$ phase values produced by the shearing interferometer into the required phase correction values is mathematically a matrix inversion followed by a least squares smoothing. To carry out this operation with a digital computer for a large number of channels at the required speed would require a relatively large, high speed machine with input and output multiplexers and A/D and D/A hardware. The accuracy requirements are relatively low (on the order of 1%), and this fact coupled with the need for high speed operation with parallel input and output channels makes the use of a special purpose analog computer a better choice.

Figure 6:
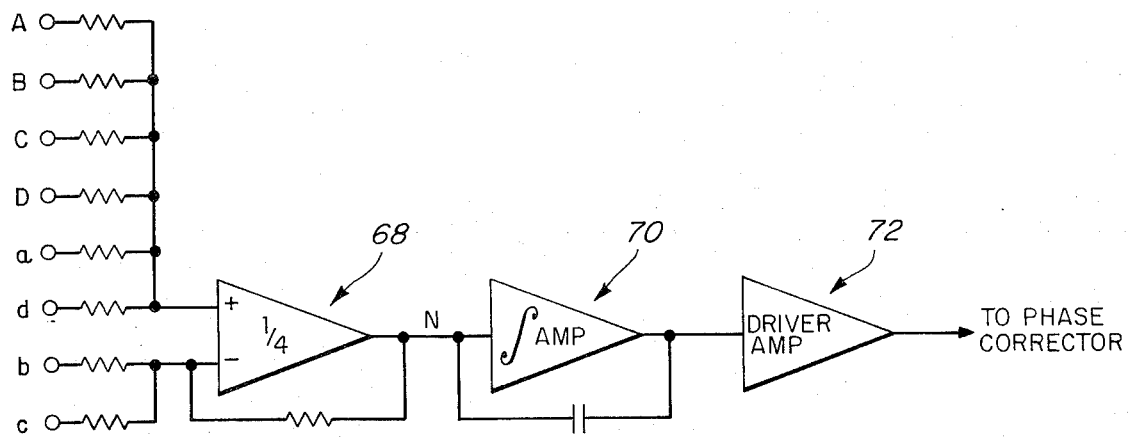
FIG. 6 shows an analog circuit for carrying out the vector combinations illustrated by FIGS. 4 and 5, and also circuitry leading to the phase corrector.

The function and operation of the parallel data processor is illustrated in FIGS. 4, 5 and 6. Referring to FIGS. 4 and 5, it can be seen that any point in the illustrated phase corrector array, such as N, in FIG. 4 is connected to surrounding points only through four measured phase shift vectors $a$, $b$, $c$, and $d$ which are algebraically added to the phase shifts existing at the points A, B, C, and D. The phase shift value at N is therefore $N = 1/4(A + B + C + D + a - b - c + d)$.

Referring to FIG. 5, there is depicted the interrelationship of phase shift vectors for a complete matrix consisting of 32 measured phase shift vectors (the outputs from the interferometer) for 21 points (with each point representing a correction element in the phase corrector). The phase shift value for each separate point may be computed by a separate analog computing circuit 68 for this function as shown in FIG. 6. This results in an analog parallel data processor having twenty circuits for the 21 point matrix (one of the points, e.g., the center one, is grounded as a reference). Each computing circuit has eight inputs and one output, although some of the points around the periphery of the matrix do not utilize all of the inputs. Four of the inputs ($a$, $b$, $c$, $d$) are from the interferometer and are voltages proportional to measured phase shifts. The other four inputs (A, B, C, D) are voltage outputs of other computing circuits. Each input terminal has an input resistor of equal value. The summing amplifier 68 effectively adds the total current from the top six terminals, substracts the current from the bottom two terminals, and produces an output proportional to the result. As is well known in the art a resistor is utilized in a negative feedback loop to control the gain of the amplifier. A fast settling operational amplifier, such as Burr-Brown 3500 CN, which has internal compensation, is suitable for use in the circuit of FIG. 6. The output of each computing circuit 68 is directed to an integrating amplifier 70, shown schematically as an amplifier with a capacitance in its feedback loop. Typically, amplifier 70 would provide selectable gain and bandwith capabilities to optimize system operational stability. An integrating amplifier is utilized in the preferred closed-loop embodiment because phase excursions over the entire wavefront may be as much as several wavelengths, but the output of each phase detector channel from the interferometer provides unambiguous wavefront information up to only ± ½ wavelength. The integration by amplifier 70 allows an analog voltage to be built up and stored over several measurement cycles, which then causes the mirror 20 to deform by several wavelengths. The output from integrating amplifier 70 is received by a high voltage driver amplifier 72. Each driver amplifier drives one piezoelectric element of the wavefront corrector. This amplifier accepts a low level voltage signal at its input, and converts it to a voltage of up to several thousand volts to drive the piezoelectric elements of the phase corrector.

Figure 7:
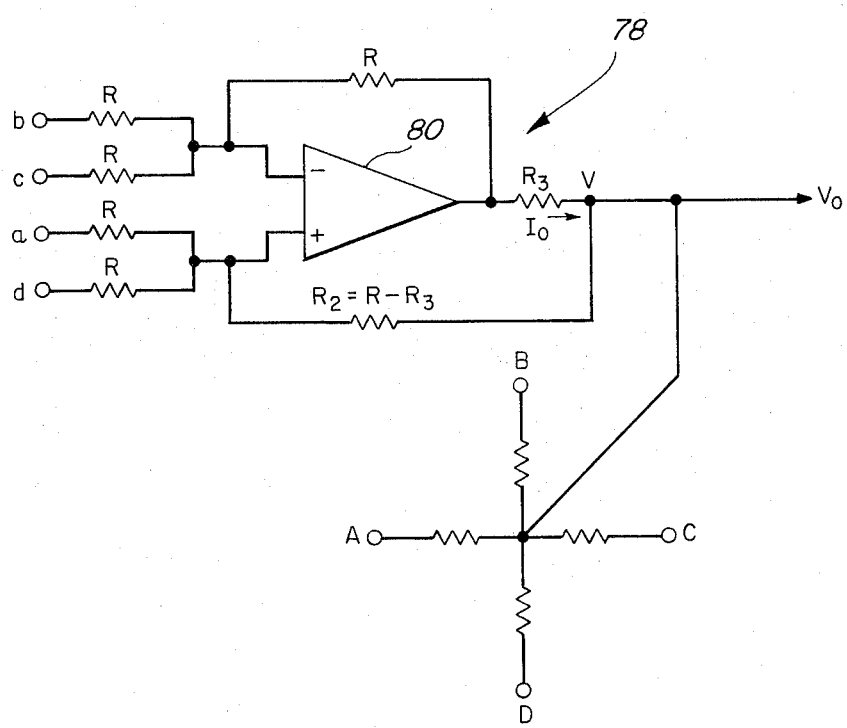
FIG. 7 illustrates a second embodiment of an analog circuit for carrying out the vector combinations.

An alternative embodiment for the analog parallel data processor comprises a conduction matrix rather than a voltage matrix as shown in FIG. 6. One advantage of a conduction matrix over a voltage matrix is that its design is considerably simpler. The matrix is similar to the matrix illustrated in FIG. 5, and includes twenty current generators (one for every point in the matrix but the center point). Adjacent points in the matrix are connected by identical resistors. All $x$ and $y$ inputs to the current generators are voltage outputs from the interferometer and are proportional to the measured phase differences. The output of each current generator is applied to one node of the array. One current generator 78 and its connection to the array is illustrated in FIG. 7. $x$ and $y$ inputs from the shearing interferometer are received as inputs $b$, $c$, $a$, and $d$ to an amplifier 80. The amplifier has both negative and positive feedback. For an amplifier connected as illustrated in FIG. 7 and wherein all the resistors R are equal, the output current $I_0 = \frac{1}{4} \, 1/R_3(a-b-c+d)$. The voltage $v$ at the output of the current generator $= I_0 \times R_3$ which $= \frac{1}{4}(a-b-c+d)$. The voltage $V_0$ is dependent upon both the current $I_0$ produced by the current generator 78 and the combined voltage from adjacent nodes to which it is connected in the matrix by identical resistors. The combined voltage from adjacent nodes is the average of the voltages A, B, C and D or $\frac{1}{4}(A+B+C+D)$. Therefore, the total output voltage $V_0 = \frac{1}{4}(A+B+C+D+a-b-c+d)$, which is the desired voltage.

The system has been described thus far as a closed loop system in which the reference image for the phase distortion detector is picked off after the wavefront corrector has operated on the image. In an open loop design the reference image for the phase distortion detector is picked off before the wavefront is incident on the phase corrector. A closed loop system has several very important advantages. Most important, since the reference image is picked off after the wavefront has travelled through the optical system and phase corrector, in principle the system will compensate for any distortion introduced by the optical system up to the point where the imaging and reference beams are separated, so that near diffraction limited performance may be obtained from somewhat imperfect optical systems. A closed loop system also minimizes the phase error without the need for critical calibration or adjustment of components within the loop. A further advantage of a closed loop system employing an integrator (like element 70), is that the range of applied phase correction is not limited by the instantaneous measuring capability of the phase error sensing system. This is very desirable in a system (as described in detail in this patent application) in which the required phase correction may be several wavelengths, and the phase error sensing system has a more limited range ($\pm \frac{1}{2}$ wavelength). However, embodiments of the present invention might be desired under some circumstances based on an open loop design.

Figure 8A:
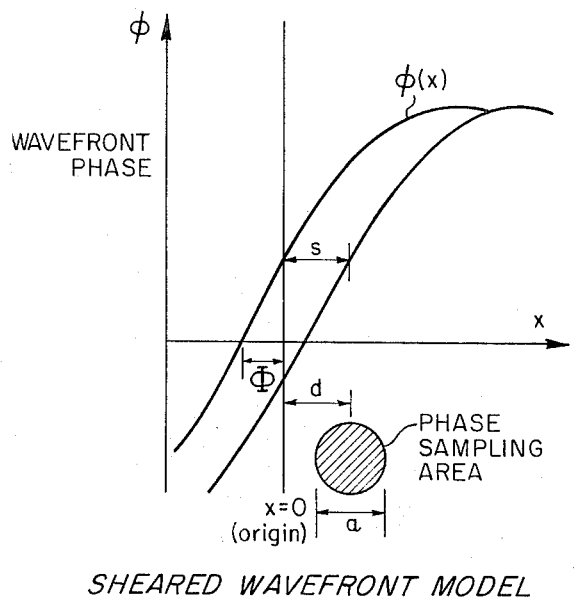
FIG. 8 illustrates some optimum relationships between photodetectors in the photodetector array in the shearing interferometer and corrector points in the phase corrector.
Figure 8B:
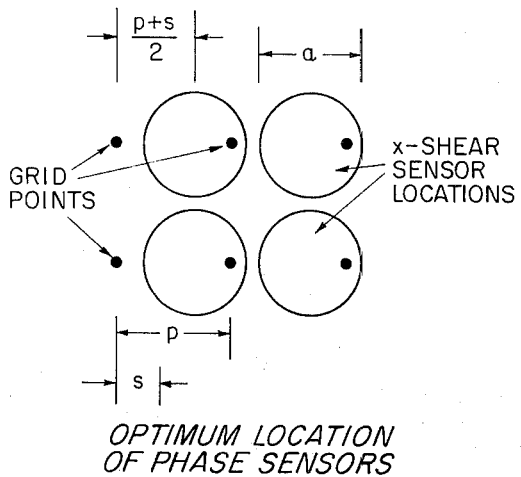

Several considerations should be borne in mind to optimize the designs of the shearing interferometer and the phase corrector. Reference should be made to FIG. 8 for consideration of other parameters. FIG. 8 shows a wavefront defined as $\phi(x)$ displaced by a shear distance $s$ from a sheared wavefront. The distance over which each waveform is sampled (the width of the photodetector) is defined as $a$. The distance over which the wavefront is sampled is centered a distance $d$ from the origin. $p$ is the distance between adjacent phase corrector elements in the phase corrector. An analysis of the various parameters in the interferometer and phase corrector (which will not be detailed herein) has indicated that interferometer error is minimzed when the phase sampling area is approximately centered, as shown in FIG. 8B, with respect to the grid points at half the grid spacing $p$ plus half the shear distance $s$. This condition is intuitively satisfying because at this location the phase sampling area covers the maximum common area of the two sheared wavefronts. Also in the special case where the shear distance $s$ is equal to the grid spacing $p$, it accurately describes the correct sampling position which is coincident with the grid.

When the wavefront being measured possesses phase excursions of several wavelengths, as is the case with atmospheric distortion, it may be necessary to use a small shear distance $s$ in order to avoid the measurement ambiguity that would occur if the phase measured by the phase error sensing system exceeds one-half wavelength. This is illustrated in FIGS. 8A and 8B which shows a shearing interferometer wherein the shear distance $s$ is less than the spacing $p$ between adjacent grid points. In most shearing interferometers of the prior art, the shear distance $s$ is typically selected to be equal to the spacing $p$. By selecting $s$ to be a fraction of $p$ according to the formula $1/n \, p$, the interferometer may unambiguously measure phase differences existing between adjacent grid points which are greater than $\frac{1}{2}\lambda$. If, for example, $n$ in the above formula is selected to be four, then phase excursions of up to two wavelengths between adjacent grid points may be measured without exceeding the $\pm \frac{1}{2}\lambda$ range of the phase detectors.

The number of phase corrector elements in the disclosed embodiment is 21 which is a suitable number for a telescope of up to about 0.5 meter aperture. For larger telescopes the number of phase corrector elements may be several hundred.

Figure 9:
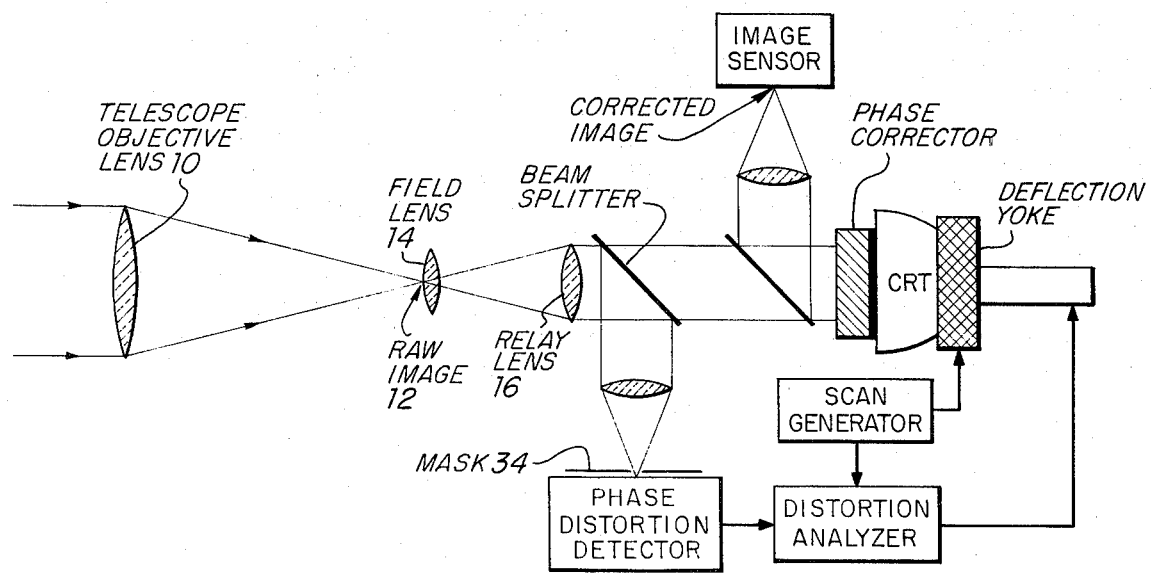
FIG. 9 shows another preferred embodiment of applicant's invention wherein the phase corrector is a refractive element, the refractive index of which is selectively controlled by the incidence of light from a cathode ray tube.

Referring to FIG. 9, there is illustrated another preferred embodiment of the system which is similar to the embodiment of FIG. 1 except that the phase corrector system is different. In the embodiment of FIG. 9, the phase of various points in the wavefront is changed by passing the light beam twice through a crystal, the index of refraction of which is selectively varied in different areas of the crystal. A system which may be made to operate in this manner is discussed in detail in the December, 1972 issue of Applied Optics, and particularly on page 2763 thereof. Operation of the Pockels Readout Optical Memory (PROM) system is based on the control of the refractive index of a bismuth-silicon-oxide ($Bi_{12}SiO_{20}$) crystal as a function of the point by point light intensity of an image impressed on the crystal. When used as a phase corrector, the polarization of the applied light beam is aligned with one of the induced birefringent axes so that the phase retardation at each point in the crystal is proportional to the exposure (light intensity $x$ time) received at that point. The point by point light intensity impressed on the crystal is controlled by a cathode ray tube adjacent to the crystal. The scanned pattern on the face of the CRT is controlled in accordance with the output of the phase distortion detector system.

In yet another embodiment, not illustrated, the refractive index of a bismuth-silicon-oxide crystal is varied as a function of applied voltage across the crystal. In one embodiment the crystal is about one millimeter thick and fifteen millimeters in diameter. A single transparent electrode is placed on the front surface, and an array of 21 directly addressed electrodes are positioned on the back reflecting surface. The crystal phase corrector is a solid state device, and a response time of less than one millisecond should be obtainable.

Although the disclosed embodiment is a system for eliminating distortion from a plane wavefront, it should be realized that the teachings of this invention might be utilized to achieve a wavefront having any desired shape such as a spherical or elliptical wavefront.

While several embodiments have been described, the teachings of this invention will suggest many other embodiments to those skilled in the art.

I claim:

1. In an optical system for imaging objects of interest through the atmosphere, apparatus for the real-time detection and correction of phase distortions in a wavefront being imaged by said optical system, said phase distortions being at least in part produced by turbulence within the atmosphere through which said object of interest is imaged, said apparatus comprising:

a. lateral shearing interferometer means, having said distorted wavefront incident thereon, for simultaneously determining in parallel and in real time relative phase differences between different areas of said distorted wavefront, and for generating signals indicative of said phase differences, said lateral shearing interferometer means including means for permitting said interferometer means to operate with white light;

b. means responsive to said phase difference signals for simultaneously generating in parallel and in real time phase corrector signals indicative of phase corrections for different areas of said distorted wavefront to achieve a corrected wavefront; and, c. phase corrector means having said distorted wavefront incident thereon and being responsive to said phase corrector signals for changing in real time phase differences between different areas of said distorted wavefront for changing the shape of said distorted wavefront to achieve said corrected wavefront.

2. A system as set forth in claim 1 and wherein the system is a closed loop system wherein said phase corrector means changes the shape of the wavefront before the wavefront is incident upon said lateral shearing interferometer means for determining phase differences.

3. A system as set forth in claim 1 wherein said phase corrector means includes a mirror means having an array of electroresponsive elements, with each element being responsive to one of said phase corrector signals, for selectively deforming the mirror to change the shape of the wavefront.

4. A system as set forth in claim 1 wherein said phase corrector means includes a refractive phase correction means for selectively changing its index of refraction in different areas upon which the wavefront is incident to change the shape of the wavefront.

5. A system as set forth in claim 1 wherein said shearing interferometer means includes:

a. first and second diffraction gratings, each of which has a slightly different grating frequency, for shearing the wavefront in a first direction;

b. a first achromatizing diffraction grating following said first and second gratings and having a grating frequency substantially halfway between the grating frequencies of said first and second diffraction gratings, to achromatize the interferometer to allow it to operate with white light;

c. a first field lens means following said achromatizing grating for forming a first sheared image of the entrance pupil of the optical system at an image plane;

d. a first detector means positioned in said image plane of said first field lens means for detecting the shearing interferogram formed thereat;

e. third and fourth diffraction gratings, each of which has a slightly different grating frequency, for shearing the wavefront in a second direction substantially perpendicular to said first direction;

f. a second achromatizing diffraction grating, following said third and fourth gratings and having a grating frequency substantially halfway between the grating frequencies of said third and fourth diffraction gratings, to achromatize the interferometer to allow it to operate with white light;

g. a second field lens means following said second achromatizing grating for forming a second sheared image of the entrance pupil of the optical system at an image plane; and h. a second detector means positioned in said image plane of said second field lens means for detecting the shearing interferogram formed thereat.

6. A system as set forth in claim 5 and wherein:

a. said first and second detector means each includes an array of photodetectors;

b. said phase corrector means includes an array of electroresponsive elements, each of which is responsive to one of said phase corrector signals and each of which is separated from adjacent electroresponsive elements by a distance $p$;

c. said lateral shearing interferometer means shears the wavefront by a shear distance $s$ in said first direction and said second direction; and d. the detectors in said first and second detector arrays are approximately centered with respect to the electro-responsive elements in said phase corrector array at half the distance $p$ plus half the shear distance $s$.

7. A system as set forth in calim 6 and including translating drive means for moving said first, second, third and fourth diffraction gratings to heterodyne the shearing interferograms detected by said first and second detector means.

8. A system as set forth in claim 1 and wherein the system is utilized in a telescope having an entrance pupil and a prime focal plane and the system includes means for relaying an image of the wavefront incident on the telescope entrance pupil onto said phase corrector means and for relaying the image formed at said prime focal plane onto said lateral shearing interferometer means.

9. A system as set forth in claim 8 wherein the system is a closed loop system wherein said relaying means relays the image onto said means for determining phase differences after the wavefront has been incident on said phase corrector means.

10. A system as set forth in claim 9 wherein said shearing interferometer means includes:

a. first and second diffraction gratings, each of which has a slightly different grating frequency, for shearing the wavefront in a first direction;

b. a first achromatizing diffraction grating following said first and second gratings and having a grating frequency substantially halfway between the grating frequencies of said first and second diffraction gratings, to achromatize the interferometer to allow it to operate with white light;

c. a first field lens means following said achromatizing grating for forming a first sheared image of the entrance pupil of the telescope at an image plane;

d. a first detector means positioned in said image plane of said first field lens means for detecting the shearing interferogram formed thereat;

e. third and fourth diffraction gratings, each of which has a slightly different grating frequency, for shearing the wavefront in a second direction substantially perpendicular to said first direction;

f. a second achromatizing diffraction grating, following said third and fourth gratings and having a grating frequency substantially halfway between the grating frequencies of said third and fourth diffraction gratings, to achromatize the interferometer to allow it to operate with white light;

g. a second field lens means following said second achromatizing grating for forming a second sheared image of the entrance pupil of the telescope at an image plane; and h. a second detector means positioned in said image plane of said second field lens means for detecting the shearing interferogram formed thereat.

11. A system as set forth in claim 10 wherein:

a. said first and second detector means each includes an array of photodetectors;

b. said phase corrector means includes an array of electroresponsive elements, each of which is responsive to one of said phase corrector signals and each of which is separated from adjacent electroresponsive elements by a distance $p$;

c. said lateral shearing interferometer means shears the wavefront by a shear distance $s$ in said first direction and said second direction; and d. the detectors in said first and second detector arrays are approximately centered with respect to the electro-responsive elements in said phase corrector array at half the distance p plus half the shear distance $s$.

12. A system as set forth in claim 11 and including translating drive means for moving said first, second, third and fourth diffraction gratings to heterodyne the shearing interferograms detected by said first and second detector means.

* * * * *